(12) United States Patent
Hoekstra

(10) Patent No.: US 8,258,703 B1
(45) Date of Patent: Sep. 4, 2012

(54) ADAPTER FOR TRAILER LIGHTING CONTROL FROM MODULATED INPUT SIGNALS

(76) Inventor: Eric J. Hoekstra, Holland, MI (US)

( * ) Notice: Subject to any disclaimer, the term of this patent is extended or adjusted under 35 U.S.C. 154(b) by 411 days.

(21) Appl. No.: 12/574,812

(22) Filed: Oct. 7, 2009

Related U.S. Application Data

(60) Provisional application No. 61/103,320, filed on Oct. 7, 2008.

(51) Int. Cl.
 *B60Q 1/14* (2006.01)
 *B60Q 1/26* (2006.01)
(52) U.S. Cl. .............................. 315/77; 315/80; 340/431
(58) Field of Classification Search .................... 315/77, 315/80, 86, 87; 303/123, 20, 7; 340/431, 340/467
See application file for complete search history.

(56) References Cited

U.S. PATENT DOCUMENTS

| | | | |
|---|---|---|---|
| 4,006,453 A | 2/1977 | Bryant | |
| 5,030,938 A | 7/1991 | Bondzeit | |
| 5,241,241 A | 8/1993 | Eccleston | |
| 5,498,910 A | 3/1996 | Hopkins et al. | |
| 5,521,466 A * | 5/1996 | Vincent | 315/77 |
| 5,701,116 A | 12/1997 | Hoekstra | |
| 6,177,865 B1 * | 1/2001 | Bryant et al. | 340/431 |
| 6,232,722 B1 * | 5/2001 | Bryant et al. | 315/80 |

\* cited by examiner

*Primary Examiner* — Daniel D Chang
(74) *Attorney, Agent, or Firm* — Gardner, Linn, Burkhart & Flory, LLP

(57) ABSTRACT

A trailer light adapter that is adapted to supply signals to operate the lights of a towed vehicle from modulated signals of a lighting circuit of a towing vehicle, includes at least one input that is adapted to receive a modulated signal from the lighting circuit of the towing vehicle and at least one output that is adapted to supply an output signal to operate a light of the towed vehicle. The adapter further includes a decoder that is adapted to decode a modulated signal and to provide a decoded signal indicative of a desired state of the light of the towed vehicle. The adapter further includes a power circuit that is responsive to the decoded signal and is adapted to supply the output signal to operate the light of the towed vehicle. The adapter may be responsive to a variable voltage modulated signal, a pulse-width modulated signal, or the like.

18 Claims, 5 Drawing Sheets

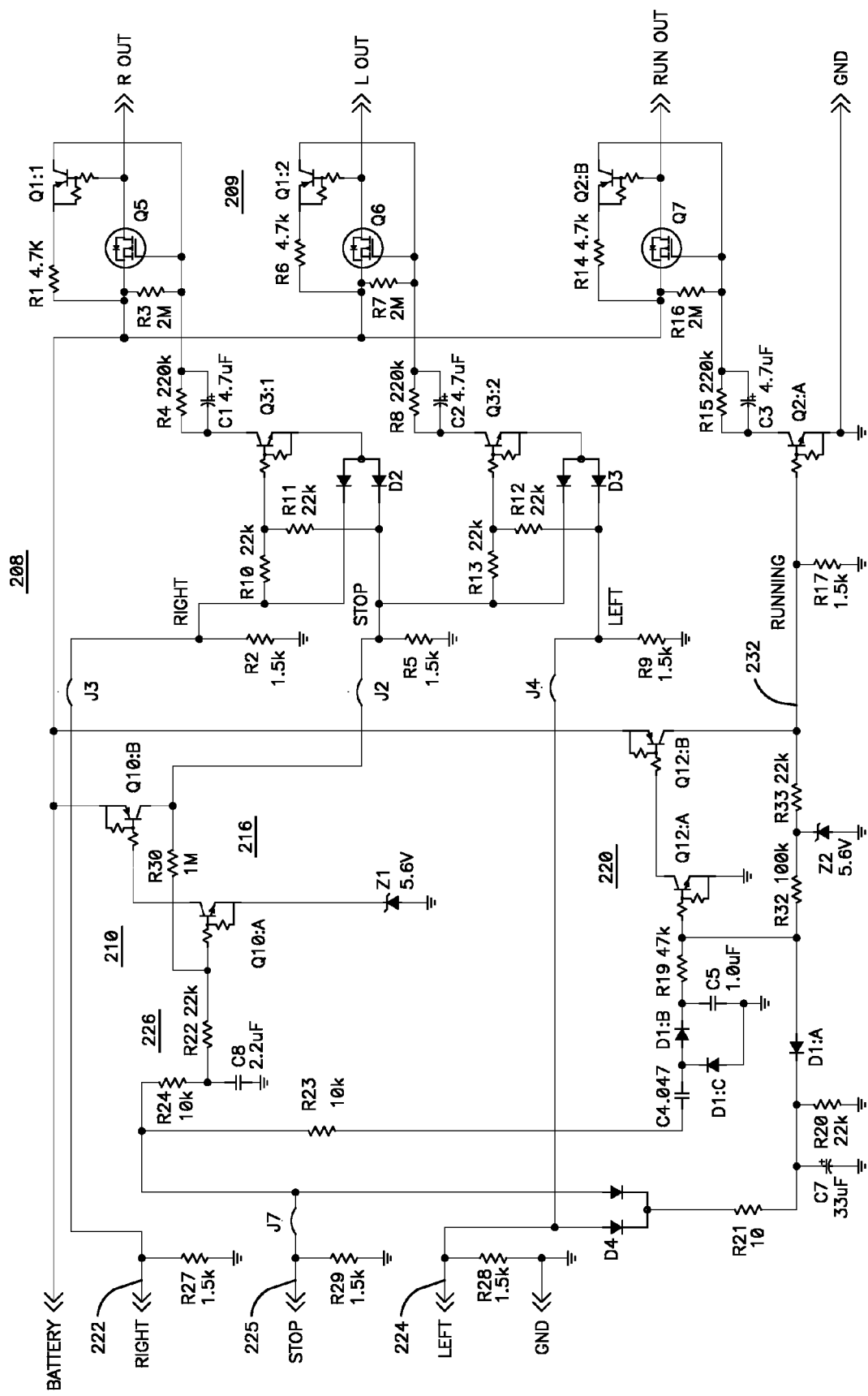

ADAPTER FOR TRAILER LIGHTING CONTROL FROM MODULATED INPUT SIGNALS

CROSS REFERENCE TO RELATED APPLICATION

This application claims priority from U.S. provisional patent application Ser. No. 61/103,320, filed on Oct. 7, 2008, the disclosure of which is hereby incorporated herein by reference in its entirety.

BACKGROUND OF THE INVENTION

The present invention is directed to electronic converter circuits which are used to sense indicator signals generated by a towing vehicle and in response drive the lighting circuits of a towed trailer.

Devices for the interface of trailer lights to a towing vehicle are well known. Since towing vehicles started separating the turn signal lamps from the brake signal function, converters have been used to combine the STOP and TURN signals to drive the combination lights typically used on trailers.

Recent innovations in the electrical systems of the towing vehicles have further combined the signal lighting. In these vehicles, a single lamp can be used to indicate a turn signal, a stop signal, and the running light indication by allowing the intensity of the lamp to be controlled. This is done by modulating the energy supplied to the lamp. This could be done by producing multiple different voltages to drive the lamp. More commonly, it is done by driving the lamp using pulse-width modulation (PWM) techniques to efficiently operate the lamp in a dim mode to indicate the running light condition and operate the lamps at 100 percent brightness to indicate a stop or turn.

It is possible to interface a trailer lighting system to a towing vehicle having modulated lighting, such as PWM or variable voltage, using a buffered lighting converter of the type disclosed in my patent application Ser. No. 12/369,207, filed Feb. 11, 2009, for a PROTECTED TRAILER LIGHTING CONVERTER, or other known buffered converter, by locating an appropriate signal wire at whatever location it may be in the vehicle and supplying the converter. The STOP light signal is usually available in the center high mounted stoplight location (CHMSL); RUNNING light signals can be found at the side marker light locations (including the front side markers). Left and right turn lamp signals may be obtained at the dashboard. Installations performed this way may be difficult to complete as these circuits may be long distances away from the required connections to the trailer.

SUMMARY OF THE INVENTION

As it is often inconvenient or difficult to locate separate signal lines for the STOP, LEFT and RIGHT turn, and RUNNING light circuits, the present invention provides an adapter to decode the combined signals as available at the towing vehicle lights and provide signals as required by the trailer installation.

A trailer light adapter that is adapted to supplying signals to operate lights of a towed vehicle from modulated signals of a lighting circuit of a towing vehicle, according to an aspect of the invention, includes at least one input that is adapted to receive a modulated signal from the lighting circuit of the towing vehicle and at least one output that is adapted to supply an output signal to operate a light of the towed vehicle. A decoder is provided that is adapted to decode a modulated signal and to provide a decoded signal indicative of a desired state of the light of the towed vehicle. A power circuit is provided that is responsive to the decoded signal and is adapted to supply the output signal to operate the light of the towed vehicle.

The output may be adapted to be connected with the light of the towed vehicle and the output signal may be adapted to directly illuminate the light of the towed vehicle. Alternatively, the output may be adapted to be connected with a buffer circuit that is capable of illuminating the light of the towed vehicle and the output signal may be adapted to cause the buffer circuit to illuminate the light of the towed vehicle.

The at least one input may be two or more inputs that are adapted to be connected with the left rear light of the towing vehicle and the right rear light of the towing vehicle. The at least one output may be three of more outputs adapted to supply, respectively, a signal to operate a right rear light of the trailer, a signal to operate the left rear light of the trailer, and a signal to operate the running light of the trailer.

The decoder circuit may be an analog circuit. The decoder may be adapted to supply a first decoded signal when a modulated signal, such as a pulse-width modulated signal, is supplied to the at least one input is at a 100 percent duty cycle and to supply a second decoded signal when the modulated signal supplied to the at least one input is at a duty cycle that is less than a 100 percent duty cycle. The decoder may include a latch that is adapted to maintain the second decoded signal notwithstanding occurrences of a 100 percent duty cycle of the modulated signal supplied to the at least one input. The decoder may include a voltage responsive trigger circuit that produces the first decoded signal when the average voltage level of the modulated signal supplied to the at least one input is above a particular level. The decoder may include a pulse-detecting circuit that produces the second decoded signal when the modulated signal is pulsing. The pulse-detecting circuit may include a capacitive charge pump circuit.

The decoder circuit may be a programmed digital logic circuit. The decoder may be adapted to supply a first decoded signal when the modulated signal supplied to the at least one input is at a high voltage or 100 percent duty cycle and to supply a second decoded signal when the modulated signal is at a lower voltage or a duty cycle that is less than 100 percent duty cycle. The decoder circuit may discontinue the second decoded signal in response to a zero voltage or duty cycle.

The adapter circuit may be configured to directly drive the lighting of the towed vehicle. It may, alternatively, be configured for use with a buffered lighting converter module, which, in turn, drives the lighting of the towed vehicle. The adapter circuit may, alternatively, be included as a sub-circuit within a converter module.

These and other objects, advantages and features of this invention will become apparent upon review of the following specification in conjunction with the drawings.

BRIEF DESCRIPTION OF THE DRAWINGS

FIGS. 4a and 4b are different configurations of an adapter combined with a buffering lighting converter.

DESCRIPTION OF THE PREFERRED EMBODIMENT

Figure 1:
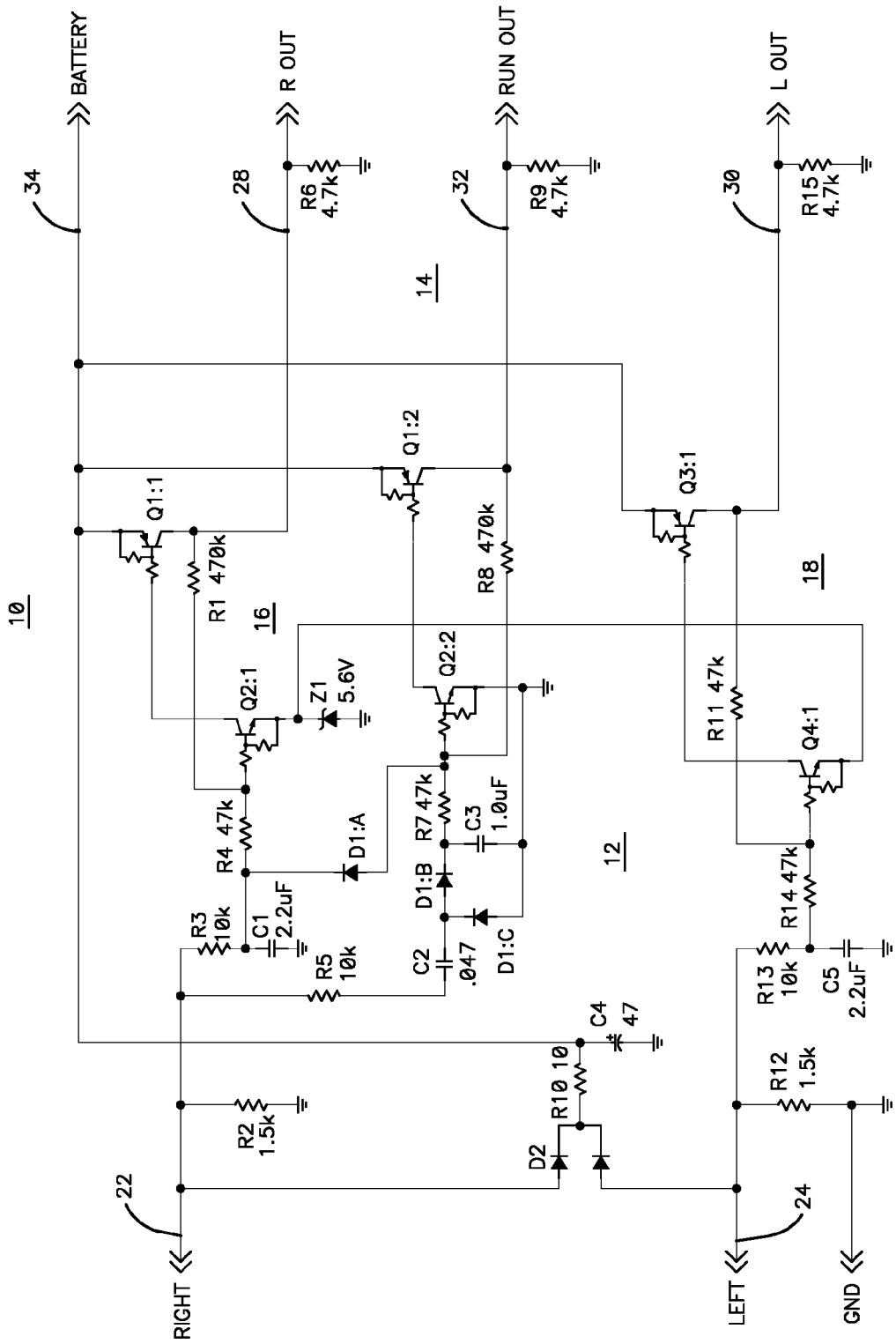
FIG. 1 is an electrical schematic diagram showing a preferred embodiment of the invention, illustrated as an analog circuit.

Referring now to the drawings and the illustrative embodiments depicted therein, an adapter module 10 has two inputs from the RIGHT and LEFT signal circuits of the towing vehicle (FIG. 1). These combined signals are decoded to produce three active high outputs for the RIGHT, LEFT, and RUNNING light circuits as required by the trailer or other towed vehicle. By detecting the combined signals from the two connections required, the installation effort is greatly reduced.

Each input has possible states of OFF, BRIGHT, and DIM. These states may correspond to the following voltages:

| | |
|---|---|
| OFF | nominally 0 V. |
| BRIGHT | nominally 12 V. |
| DIM | PWM, nominally 20% duty cycle at approximately 80 to 200 Hz. |

Since the vehicle signal may go from DIM (indicating a running light ON condition) to BRIGHT (indicating a STOP or TURN signal condition), even when the RUNNING light condition persists, the RUNNING light condition is latched through positive feedback once set until an "OFF" condition is registered.

Adapter 10 includes a decoder circuit 12 which is illustrated as having a Schmidt trigger 16 formed by transistors Q2:1 and Q1:1 operating at a threshold set by zener diode Z1 at nominally 6.2V. This sub-circuit monitors the average voltage on a RIGHT input 22; it activates the R_OUT output 28 when the average voltage exceeds the threshold voltage indicating a BRIGHT condition. Decoder circuit 12 further includes a second Schmidt trigger 18 made up of transistors Q4:1 and Q3:1 which monitors the LEFT input in like fashion, activating the L_OUT output 30 when a LEFT input 24 indicates a BRIGHT condition.

A capacitive charge pump 20 made up of capacitors C2 and C3 and diodes D1:B and D1:C is used to detect a pulsing input if present on the RIGHT input. This signal is monitored by a third Schmidt trigger comprised of transistors Q2:2 and Q1:2 and asserts a RUN_OUT output 32 when the DIM mode is present. In addition, positive feedback is used to latch this circuit ON once set until the input falls to nominally zero volts. This ensures that RUNNING light operation is not interrupted by STOP light actuation.

Adapter 10 additionally includes a power circuit 14 that supplies output signals to operate the lights of the towed vehicle either directly or through a buffered lighting circuit, such as the type disclosed in patent application Ser. No. 12/369,207, filed Feb. 11, 2009, for a PROTECTED TRAILER LIGHTING CONVERTER, the disclosure of which is hereby incorporated herein by reference. Power circuit 14 is made up of transistors Q1:1, Q1:2 and Q3:1.

The circuit operation in each of these modes can be described as follows:

A. BRIGHT: A bright condition from either the LEFT or RIGHT side of the towing vehicle at respective LEFT input 24 or RIGHT input 22 is indicated when the average voltage is greater than a threshold voltage, such as approximately 6V. This is detected using a capacitive integrator 26 formed by resistor R3 and capacitor C1 and monitored by the comparator formed by transistors Q1:1 and Q2:1 for the RIGHT channel. The LEFT channel is similar, using corresponding components resistor R13, capacitor C5, and transistors Q3:1, Q4:1.

When RIGHT input 22 is in a BRIGHT condition, capacitor C1 charges to a high voltage which turns on transistors Q2:1 and Q1:1. This pulls the R_OUT output 28 high to command the right trailer signal lamp ON. Similarly, when the LEFT input 24 is in a BRIGHT condition, capacitor C5 charges to a high voltage which turns on transistors Q4:1 and Q3:1, pulling the L_OUT output 30 high to command the left trailer signal lamp ON. Since the BRIGHT state is a steady DC voltage, capacitor C2 charges, but capacitor C3 stays at a low voltage. Transistors Q2:2, Q1:2 stay turned OFF and the RUN_OUT output 32 remains low.

B. DIM: A "dim" condition is indicated by the towing vehicle driving the signal lamp with an average voltage of more than zero but less than some maximum average voltage, typically approximately 2.5V. For power efficiency, this is commonly done using a PWM technique where the lamp is pulsed ON then OFF at a rapid rate; the ON time is typically 20% of the total time to produce the required level of brightness. This on/off pulsing is detected by the charge pump 20 formed by capacitors C2 and C3 with diodes D1:B and D1:C. A comparator formed by transistors Q2:2 and Q1:2 is used to test this signal and drive output terminal 32.

It is possible to be in the "dim" state (running lights are activated), then move to a "bright" state (STOP light indication or flasher operation). It is desired that the RUNNING lights remain activated. For this reason a latch function is incorporated into the "dim" mode detection circuitry of decoder circuit 12. Once the RUNNING light mode is activated, it will stay on until all modes have been exited as indicated by an average input voltage dropping below a minimum value, such as 1 volt.

When RIGHT input 22 is in the DIM mode, capacitor C1 charges to the average voltage of the input. Since this voltage is less than the threshold set by zener diode Z1, transistors Q2:1 and Q1:1 remain OFF and R_OUT output 28 is low extinguishing the RIGHT trailer signal light. Similarly, when LEFT input 24 is in a DIM condition, capacitor C5 charges to the average voltage of the input. Since this voltage is less than the threshold set by zener diode Z2, transistors Q4:1 and Q3:1 remain OFF and L_OUT output 30 is low, extinguishing the LEFT trailer signal light.

Because the PWM input is pulsing high and low capacitor C3 is charged by the action of capacitor C2 and diodes D1:B and D1:C. This turns transistors Q2:2 and Q1:2 ON and sets the RUN_OUT output 32 high to actuate the trailer running lights. Note that the RUN_OUT circuit is latched on by positive feedback provided by resistor R5 until the input drops to the OFF state.

C. OFF: In the OFF condition, the inputs are held at a low voltage. This allows capacitors C1 and C5 to discharge and the $R_{OUT}$ output 28 and L_OUT output 30 go to a low (OFF) state. In addition, as capacitor C1 discharges through resistor R3, diode D1:A conducts turning transistor Q2:2 OFF and discharging capacitor C3. This turns transistor Q1:2 OFF and RUN_OUT output 32 goes to a low (OFF) state.

In the illustrated embodiment, RIGHT and LEFT channels operate independently of each other to enable turn signal indication; the RIGHT channel is also monitored to detect the DIM or RUNNING light mode.

Optionally, a pair of diodes D2 may supply a BATTERY line 34 through a resistor R18. This would allow the adapter module to be powered directly from the PWM signals supplied by the towing vehicle. This may eliminate the necessity to make a separate connection to a battery or ignition line of the towing vehicle. Also, it may provide a BATTERY adapter output line to power downstream circuits. However, module 10 could, alternatively, be powered from the battery line of the towing vehicle.

Figure 2:
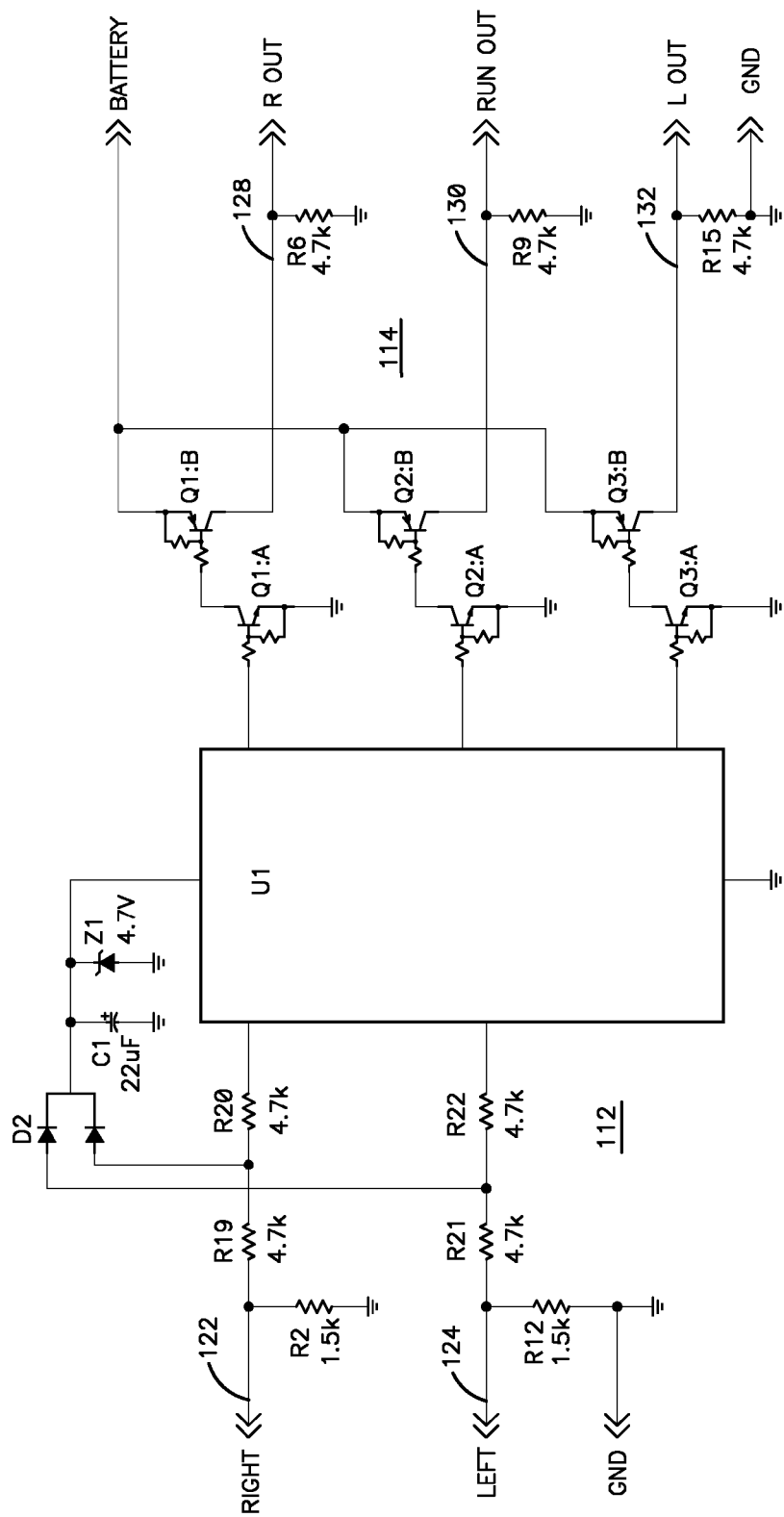
FIG. 2 is the same view as FIG. 1 of an alternative embodiment thereof, illustrated as a programmed digital logic circuit.
Figure 3:
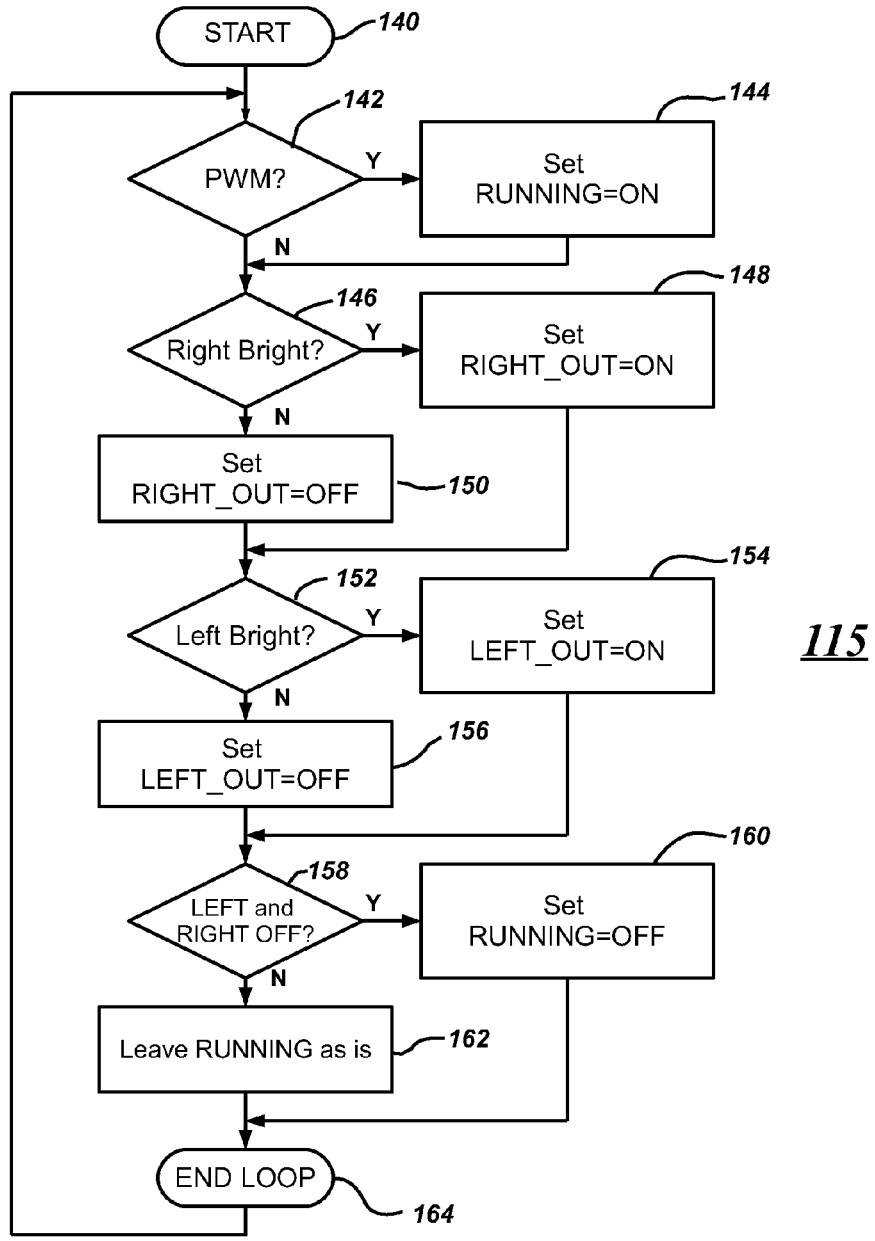
FIG. 3 is a flowchart of a program useful with the adapter in FIG. 2.

In an alternate embodiment, a decoder circuit 112 is provided by a microcontroller U1, or other form of programmed digital logic (FIG. 2). The modulated input signals receive a RIGHT input 122 and LEFT input 124 channels are processed as analog voltage instead of using a capacitive charge pump configuration to detect the modulated condition. The modulated condition may be a variation in the PWM of the lamp circuit or a variation in the voltage amplitude of the lamp circuit. Outputs of microcontroller U1 are supplied to a power circuit 114 made up of transistors Q1:B, Q2:B and Q3:B, as illustrated in FIG. 2. Microcontroller U1 may be programmed to carry out a decoding process 16 illustrated by flowchart in FIG. 3. Decoding process 115 is used by microcontroller U1 to actuate or not actuate the output stages in power circuit 114.

Decoding process 115 begins at 140 by determining at 142 whether the towing vehicle is driving the signal lamp at RIGHT or LEFT input 122 or 124 with an average voltage of more than zero, but less than some maximum average voltage, such as by detecting whether a pulse-width-modulated signal is present. If so, RUN_OUT output 132 is actuated at 144. If a PWM signal is not present, it is determined at 146 whether RIGHT input 122 is at a BRIGHT condition. If so, RIGHT output signal 128 is set at 148. If not, RIGHT output signal 128 is turned OFF at 150. It is then determined at 152 whether LEFT input 124 is in a BRIGHT condition. If so, then LEFT output 130 is turned ON at 154. If not, LEFT output 130 is turned OFF at 156. In order to ensure that the RUNNING lights remain activated even when LEFT or RIGHT inputs enter a BRIGHT state, it is determined at 158 whether RIGHT and LEFT inputs 122, 124 are set to OFF and not PWM. If so, RUNNING light output 132 is turned OFF at 160. If both LEFT and RIGHT inputs 158 are not set to OFF, RUNNING light output 132 is left ON at 162. Decoding process 115 is exited at 164 and repeated in a cyclical fashion.

Other variations would be apparent to one skilled in the art. For example, the modulated signal may be treated entirely as average voltages, without detecting any pulsing condition of the modulated signal. Any or all of the circuit functions use alternate electronic components, such as integrated circuits (ICs).

Figure 4B:
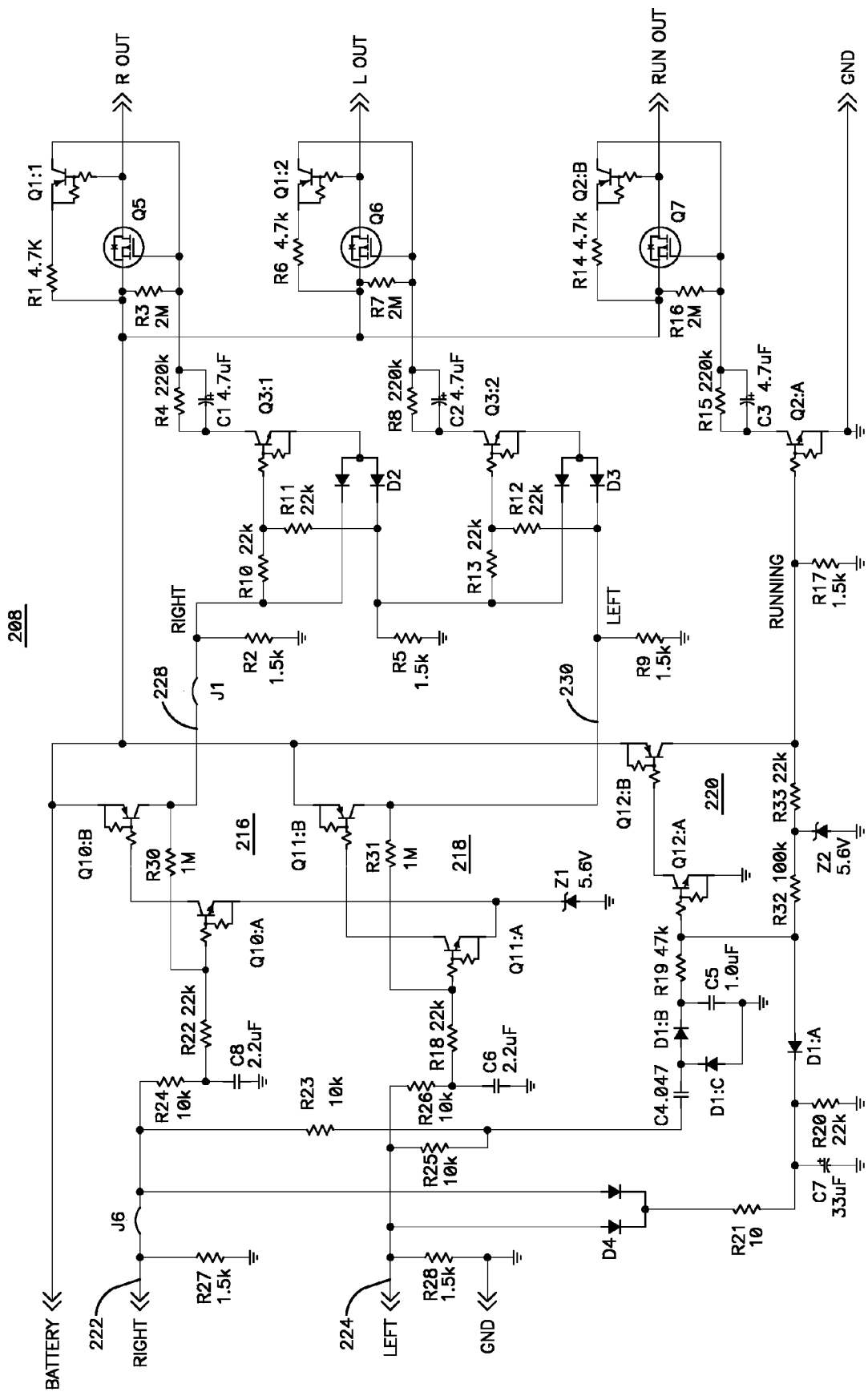

In another preferred embodiment, a trailer lighting circuit 208 may combine the functions of adapter 210 and a trailer lighting converter 209 of the type disclosed in commonly assigned U.S. patent application Ser. No. 12/369,207, filed Feb. 11, 2009, for a PROTECTED TRAILER LIGHTING CONVERTER (FIGS. 4a and 4b). Advantageously, the trailer lighting circuit 208 may utilize a common circuit board in which certain components may be present or not present on the board and certain jumpers designated J1-J7 may be present or not present on the circuit board depending upon the function performed. In a first illustrative configuration of trailing light circuit 208 illustrated in FIG. 4a, a jumper J3 directly connects a RIGHT input signal 222 to an output buffer Q5 through a diode D2 and resistor R10. A jumper J4 directly connects a LEFT input 224 with a LEFT buffer Q6 through a diode D3 and resistor R12. The functioning of buffers Q5 and Q6 are as described in the previously referred to patent application. In FIG. 4a, a jumper J7 connects a stoplight input 225 connected with the vehicle's combined stop and taillight circuit that may be accessed at either taillight assembly. The combined stop and taillight circuit typically operates at full voltage to indicate a stop condition and at a reduced voltage, such as a PWM signal, to indicate a taillight or RUNNING light condition. Input 225 is connected through a jumper J7 to a Schmidt trigger 216 and a capacitive charge pump 220, both of which function similar to Schmidt trigger 16 and capacitive charge pump 20, as previously described. This provides a stop signal at jumper J2 when input 225 is at a steady high voltage which operates RIGHT buffer circuit Q5 and LEFT buffer circuit Q6. Input 225 actuates the RUNNING light buffer Q7 when input 225 has a PWM signal on it indicating a "dim" mode, such as when the vehicle RUNNING lights are on.

In an alternative configuration of trailer lighting circuit, illustrated in FIG. 4b, a Schmidt trigger circuit 218 is populated and connected directly with a LEFT input 224. Jumpers J2-J4 and J7 are left out. A RIGHT input 222 is connected by a jumper J5 with a Schmidt trigger 216. A jumper J1 connects an output of Schmidt trigger 216 through resistor R10 and diode D2 to buffer Q5 for driving the RIGHT trailer light. The output of Schmidt trigger 218 is provided through resistor R12 and diode D3 to buffer Q6 in order to drive the LEFT lamp output on the trailer in response to PWM signal on either input. Capacitive charge pump 220 operates buffer Q7 in order to drive the RUNNING light output of the trailer in response to the PWM signal on either input. In this fashion, the configuration of trailer lighting circuit 208, illustrated in FIG. 4b, is capable of operation in the PWM mode in the same fashion as adapter 10, as previously described.

Changes and modifications in the specifically described embodiments can be carried out without departing from the principles of the invention. For example, adapter 10, 110 could be modified to operate in a three-input configuration to perform the functions illustrated in FIG. 4a. The invention is intended to be limited only by the scope of the appended claims, as interpreted according to the principles of patent law including the doctrine of equivalents.

The embodiments of the invention in which an exclusive property or privilege is claimed are defined as follows:

1. A trailer light adapter that is adapted to supplying signals to operate lights of a towed vehicle from modulated signals of a lighting circuit of a towing vehicle, said adapter comprising:
   at least one input that is adapted to receive a pulse-width modulated signal from the lighting circuit of the towing vehicle and at least one output that is adapted to supply an output signal to operate a light of the towed vehicle;
   a decoder that is adapted to decode the pulse-width modulated signal and to provide a decoded signal indicative of a desired state of the light of the towed vehicle, wherein said decoder determines an average voltage of said pulse-width modulated signal to supply the decoded signal; and
   a power circuit that is responsive to the decoded signal and is adapted to supply the output signal to operate the light of the towed vehicle.

2. The adapter as claimed in claim 1, wherein said output is adapted to be connected with the light of the towed vehicle and said output signal is adapted to illuminate the light of the towed vehicle.

3. The adapter as claimed in claim 1 in combination with a buffer circuit, said buffer circuit having a buffered output that is adapted to illuminate the light of the towed vehicle.

4. The adapter as claimed in claim 1, wherein said at least one input comprises at least two inputs, said at least two inputs adapted to be connected with the left rear light of the towing vehicle and the right rear light of the towing vehicle.

5. The adapter as claimed in claim 4, wherein said at least one output comprises at least three outputs adapted to supply a signal to respectively operate a right rear light of the trailer, a left rear light of the trailer and a running light of the trailer.

6. The adapter as claimed in claim 1, wherein said decoder circuit comprises an analog circuit.

7. The adapter as claimed in claim 1, wherein said decoder circuit comprises a programmed digital logic circuit.

8. The adapter as claimed in claim 7, wherein said decoder is adapted to supply a first decoded signal when the modulated signal supplied to said at least one input is at a high voltage or a 100 percent duty cycle and to supply a second decoded signal when the modulated signal supplied to said at least one input is at a voltage that is less than the high voltage or at a duty cycle that is less than a 100 percent duty cycle.

9. The adapter as claimed in claim 8, wherein said decoder is adapted to discontinue the second decoded signal in response to a zero duty cycle of the modulated signal supplied to said at least one input.

10. A trailer light adapter that is adapted to supplying signals to operate lights of a towed vehicle from modulated signals of a lighting circuit of a towing vehicle, said adapter comprising:
- at least one input that is adapted to receive a modulated signal from the lighting circuit of the towing vehicle and at least one output that is adapted to supply an output signal to operate a light of the towed vehicle;
- a decoder that is adapted to decode the modulated signal and to provide a decoded signal indicative of a desired state of the light of the towed vehicle; and
- a power circuit that is responsive to the decoded signal and is adapted to supply the output signal to operate the light of the towed vehicle, wherein said output is adapted to be connected with a buffer circuit that is capable of illuminating the light of the towed vehicle and wherein said output signal is adapted to cause said buffer circuit to illuminate the light of the towed vehicle.

11. A trailer light adapter that is adapted to supplying signals to operate lights of a towed vehicle from modulated signals of a lighting circuit of a towing vehicle, said adapter comprising:
- at least one input that is adapted to receive a modulated signal from the lighting circuit of the towing vehicle and at least one output that is adapted to supply an output signal to operate a light of the towed vehicle;
- a decoder that is adapted to decode the modulated signal and to provide a decoded signal indicative of a desired state of the light of the towed vehicle; and
- a power circuit that is responsive to the decoded signal and is adapted to supply the output signal to operate the light of the towed vehicle, wherein said decoder is adapted to supply a first decoded signal when the modulated signal supplied to said at least one input is at a 100 percent duty cycle and to supply a second decoded signal when the modulated signal supplied to said at least one input is at a duty cycle that is less than a 100 percent duty cycle.

12. The adapter as claimed in claim 11, wherein said decoder includes a latch that is adapted to maintain the second decoded signal, notwithstanding occurrences of a 100 percent duty cycle of the modulated signal supplied to said at least one input.

13. The adapter as claimed in claim 11, wherein said decoder comprises a voltage responsive trigger circuit that produces the first decoded signal when the average voltage level of the modulated signal supplied to said at least one input is above a particular level.

14. The adapter as claimed in claim 11, wherein said decoder comprises a pulse-detecting circuit that produces the second decoded signal when the modulated signal is pulsing.

15. The adapter as claimed in claim 14, wherein said pulse-detecting circuit comprises a capacitive charge pump circuit.

16. A trailer light adapter that is adapted to supplying signals to operate lights of a towed vehicle from modulated signals of a lighting circuit of a towing vehicle, said adapter comprising:
- at least one input that is adapted to receive a modulated signal from the lighting circuit of the towing vehicle and at least one output that is adapted to supply an output signal to operate a light of the towed vehicle;
- a decoder that is adapted to decode the modulated signal and to provide a decoded signal indicative of a desired state of the light of the towed vehicle; and
- a power circuit that is responsive to the decoded signal and is adapted to supply the output signal to operate the light of the towed vehicle, wherein said decoder is adapted to supply a first decoded signal when the variable voltage signal supplied to said at least one input is at a high voltage level and to supply a second decoded signal when the variable voltage signal supplied to said at least one input is at a reduced voltage level.

17. The adapter as claimed in claim 16, wherein said decoder includes a latch that is adapted to maintain the second decoded signal, notwithstanding occurrences of the high voltage state of the modulated voltage signal supplied to said at least one input.

18. The adapter as claimed in claim 16, wherein said decoder comprises a voltage responsive trigger, circuit that produces the first decoded signal when the average voltage level of the variable voltage signal supplied to said at least one input is above a particular level.

\* \* \* \* \*